April 19, 1960   J. A. NORTON   2,933,604
METHOD FOR TESTING OIL FILTER ELEMENTS
Filed Sept. 27, 1954

INVENTOR
JAMES A. NORTON

BY G. L. DeMott
ATTORNEY

United States Patent Office 2,933,604
Patented Apr. 19, 1960

2,933,604

METHOD FOR TESTING OIL FILTER ELEMENTS

James A. Norton, Flint, Mich., assignor to General Motors Corporation, Detroit, Mich., a corporation of Delaware Application September 27, 1954, Serial No. 458,547

11 Claims. (Cl. 250—83)

This invention relates to a method for determination of resin removal by liquids from resin-impregnated materials by radiological means. This invention also relates to the development of a test article which includes a radioactive form of the resin under test.

In the production of paper lubricating oil filter elements, particularly of those consisting of paper bellows, it is customary to impregnate the paper with a thermosetting resin, such as phenol-formaldehyde, in order to impart to its structural resistance toward collapse and tearing. To obtain optimum structural results it is the usual practice to cure the impregnated resin to a point somewhat short of completion. Under the circumstances there is a possibility that the uncured resin contained in the filter elements could be dissolved or otherwise eluted from the filter element by the lubricating oil under service conditions and deposited at various points in the lubricating oil system of, for example, an automobile engine.

It is, therefore, highly desirable in the development of satisfactory lubricating oil filters to determine whether at a given degree of cure of the resin there is any appreciable migration of uncured resin into the lubricating oil; what percentage of cure may be considered as the threshold point for migration to occur; and if there is variation in the said threshold point according to whether the lubricating oil base stock is paraffinic, naphthenic or aromatic.

If the method of analysis is to proceed by way of passing a given quantity of lubricating oil through the filter element and subsequently determining the quantity of resin contained in the oil, it is essential to employ a method of analysis which will accurately measure only the resin eluted from the filtering element in view of the fact that lubricating oil itself usually contains small amounts of resinous material.

It is, therefore, an object of this invention to provide a relatively simple and rapid method for determining accurately the resin removed from resin-impregnated oil filter elements by the oil which it filters.

It is a further object of this invention to provide a resin-impregnated filter element which can be used to determine the resin removal from a filtering element by the oil which it filters by radiological means.

The objects are accomplished as set forth in the following specification, which also includes an example of apparatus for carrying out the method of the invention. Reference is made to the drawings in which.

Figure 1:
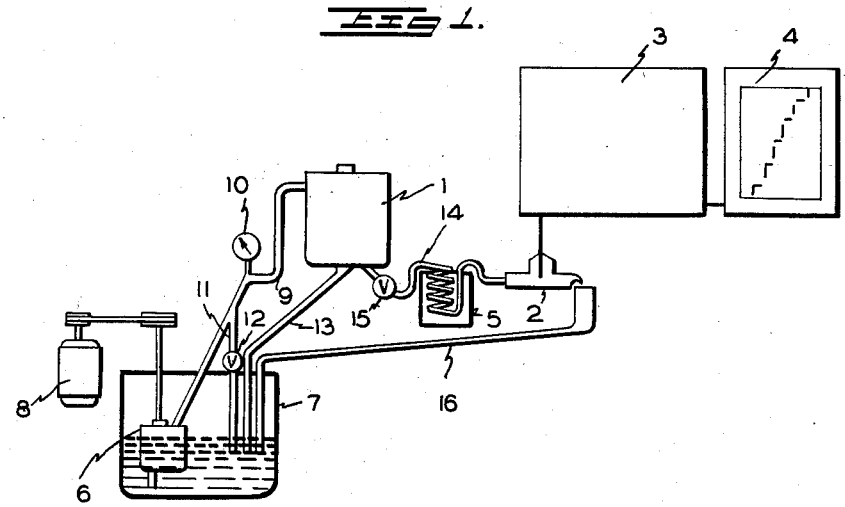
Figure 1 is a schematic view of one form of apparatus which may be used to carry out the method of the invention.

In general, the present invention consists in preparing a test filter element which is impregnated with a thermosetting resin that is chemically the same resin with which the filter is ordinarily impregnated, but which is synthesized from precursors including a precursor having a radioactive isotope of carbon, preferably carbon of atomic weight 14 as an integral part of some of the precursor molecules. After the resulting radioactive resin is cured to a desired extent, the filter element is placed in an oil circulating-filtering and counting apparatus, and the test oil is circulated through the filter element for a predetermined period of time at a predetermined rate. The amount of resin dissolved or eluted from the filter by the filtered oil preferably may be continuously measured by counting the radioactivity of the oil as it passes from the filter unit.

In a specific case, test filter elements are impregnated with phenol-formaldehyde resin. The resin dissolved or otherwise eluated by the filtered oil is determined for filter elements having uncured resin and resin cured up to 100% of completion. Accordingly, the resin for test purposes is synthesized from radiostable phenol and from formaldehyde some of whose molecules have carbon atoms which are the radioactive isotope, carbon–14. The resin could, of course, be synthesized from radioactive phenol and radioactive formaldehyde, but no advantage is gained in using more than one radioactive precursor. The resin could also be synthesized from radioactive phenol and radiostable formaldehyde; but, as will be hereinafter described, it has been found greatly advantageous to use formaldehyde as the sole radioactive precursor.

In preparing a test resin-impregnated filter element, a radioactive resin is secured which is in the same chemical state as the radiostable resin used in such filter elements under service conditions and a resin in which the radioactive atoms are integral parts of the resin molecule. Only in this way can it be assured that the action of the circulating lubricating oil on the radioactive test resin will be the same as the action of the lubricating oil in service lubricating oil systems on the service filter element counterparts, and that the radioactivity appearing in the lubricating oil perfusate is actually due to resin removed by the filter lubricating oil.

The above resin is secured by synthesis in the usual way except that one of the precursors is radioactive. In the specific case of phenol-formaldehyde resin, phenol and formaldehyde are used for resin synthesis. Since the resin is composed of carbon, hydrogen and oxygen, the selection of a radio isotope according to the method of this invention, is limited to these three elements. Carbon–14 is selected as the radio isotope because carbon–14 compounds are commercially available and have a relative long half-life, while the oxygen isotopes are very short-lived and in organic chemistry hydrogen is a labile element—that is to say, it has a tendency to wander around in the organic molecule. The radioactive isotope carbon–11 could be used instead of carbon–14, but its use would be complicated by its relatively short half-life.

Radioactive formaldehyde is used rather than radioactive phenol primarily because the conversion of formaldehyde resin is virtually quantitative whereas conversion of phenol to resin is not quantitative. In other words, the quantitative conversion of 5 mc. of radioactive formaldehyde results in 5 mc. of radioactive resin; whereas, the same quantity of radioactive phenol results in indefinitely less than 5 mc. of radioactive resin. Further if radio-phenol is used, not all observed lubricating oil radioactivity would be due to eluted resin because phenol losses from resin are variable depending upon the degree of cure, and radioactive phenol left in the resin would be removed by the oil to a greater or lesser degree. Finally, since the cost of radioactive formaldehyde is considerably less than the cost of radioactive phenol for the same amount of radioactivity, the use of radioactive formaldehyde makes possible the production of radioactive test filter elements at a cost not economically prohibitive.

The broad idea of determining the removal of matter from a test article by radiological means is well known. Thus, frictional wear articles, such as bearings, have been made radioactive by cyclotron bombardment, and the removal of metal by frictional wear determined from measurement of the radioactivity of the debris-carrying liquid. In other instances, test articles were made radioactive by admixing the radioactive substance with the material of the test article. However, these known methods of inducing radioactivity in a test article are not suitable in the case of lube oil filter elements.

By cyclotron bombardment the radioactive isotopes produced probably would not be the same element as the major component of the test sample, and the activity so produced is due to a mixture of isotopes. Further the physical structure of the sample surface is very likely to be altered because of the tremendous heat evolved during bombardment. Also with cyclotron bombardment the induced radioactivity is concentrated largely at the sample surface and mixing can be obtained only by reprocessing the sample by melting, grinding, etc. Merely admixing the radioactive substance in the resin would also be unsuitable, since it would not be known if the radioactive material dissolved or eluted by the oil is an accurate measure of the resin dissolved or eluted by the oil.

After considering the known prior art, it is apparent that the present invention comprehends a novel and unobvious method of inducing radioactivity in resin, which in turn makes possible the present resin removal determination method. It is not believed that radioactive resins have heretofore been synthesized, or more particularly, that radioactive resins have heretofore been synthesized for the purpose of making oil filter elements.

After a test filter element is impregnated with radioactive resin and cured to the desired extent, a counter and oil circulating-filtering arrangement, as shown in Figure 1, may be used to determine resin removal. Referring to Figure 1, 1 is a filtering unit in which a test filter element is placed; 2 is a counting chamber through which oil from the filter passes to be counted and which together with the counting rate meter 3 and recorder 4 constitutes the radioactivity measuring means; and 5 is an oil cooling bath located between the filter unit and the count chamber for the purpose of maintaining the oil relatively cool, preferably under 110° F. so that oil vapors will not cause a significant contamination of the counting gas. Pump 6, located at sump 7 and driven by motor 8, circulates oil through the apparatus.

In operation, the oil from sump 7 is pumped to filter unit 1 through pipe 9, which has a pressure gauge 10, bypass pipe 11 and bypass valve 12 for controlling oil circulating rate in a well-known manner. The filtered oil is returned to the sump by way of pipe 13, and a portion of the incoming oil stream is diverted for counting purposes through a filter unit outlet pipe or tap 14 which includes valve 15 for controlling oil flow to the counter. After passing through the counter, the oil is returned to the sump by way of V shaped trough 16. Incoming rather than outgoing oil is diverted for counting purposes because the outgoing oil has local high concentrations of radioactive resin which would give a false indication of the amount of resin in the test oil.

Under test conditions the circulating oil is preferably maintained at temperatures which approximate oil temperatures encountered by oil filter elements under service considerations. To this end the oil may be heated to 150° F. by friction as it is circulated, but if higher temperatures are desired extraneous heating means may be employed.

Figure 2:
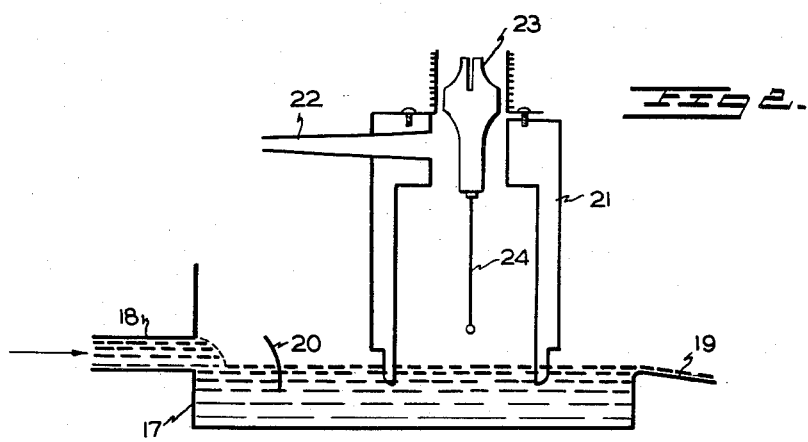
Figure 2 is a detailed view of a windowless Geiger chamber which may be used in carrying out the method of the invention.

As above indicated, a portion of the oil stream is diverted into a counting or ionization chamber. Referring to Figure 2 which shows the counter chamber 2 in greater detail, 17 represents an oil bath in the form of an open receptacle about 3 inches in diameter and about ⅞ inch deep. Oil enters at inlet 18 and leaves at outlet 19, which is designed with a spout slanted downward about 30° to assure a quick run off of oil and maintain the oil level in the bath relatively constant through a considerable range of oil input rates. 21 is a counting chamber consisting of a metal cylindrical chamber having an internal diameter of about 1¾ inches, the bottom of which is completely open, and the top of which is closed except for counting gas inlet 22. The electrode 24, which extends downwardly from the top of the chamber 21 through insulator 23 to a point about ½ inch above the bottom of the cylinder, is insulated from said chamber 21 so that a voltage of the order of 2500–3000 may be applied between the electrode 24 and the chamber 21 without danger of shorting, and with minimum leakage. In operation the oil bath 17 is maintained at the same electrical potential as the chamber 21.

In use the chamber 21 dips, open end down, into the oil bath 17 so that the chamber is sealed off from the atmosphere by the oil. The counting gas, which suitably is 96% helium and 4% isobutane, is run from a gas cylinder (not shown) through a drying tube (not shown) and thence into chamber 21 at such a rate that it bubbles out through the oil at a rate of a bubble every 2 to 3 seconds. When the air is displaced by the counting gas, the counting chamber is ready for counting. The thickness of the oil stream formed below the chamber 21 is about ½ inch, which exceeds the value of infinite thickness for carbon -14 beta particles. The ionic surges developed in the chamber 21 are amplified, fed into a counting rate meter and recorded as is well known in the art. A baffle 20 is disposed at the bath inlet to divert oil froth formed toward the spillover spout 19 so as to prevent contamination of the counting gas by air. The so-called infinite thickness of the oil stream beneath the counting chamber 21 for carbon-14 particles is a thickness such that a beta particle of maximum energy emitted at the point of infinite thickness in a direction straight toward the counting chamber, is just barely able to escape from the oil and into the counting volume. If disintegration occurs at distances from the counting volume which is greater than the so-called infinite thickness, the beta particles will be slowed down and stop before they reach the oil surface. Therefore, an infinitely thick layer of radioactive oil beneath the counting volume will result in the same rate of count registered by the counting volume as will the "infinite thickness" itself of oil. The infinite thickness of carbon-14 in oil is about one-quarter inch. The use of one-half inch oil beneath the counting chamber makes unnecessary the need for accurate positioning of the counting chamber in the oil stream.

The operation of the counter is as follows: A gradually increasing ripple free D.C. voltage is applied across the counter. A particle resulting from atomic disintegration may collide with helium atoms and ionize them. The resulting positive ions move toward the negative electrode, their speed being dependent upon the voltage gradient between the electrode and the cylinder. At a critical point during the increase of voltage, these ions acquire sufficient speed and energy to collide with helium atoms and ionize them, which, in turn, could cause further formation of new ions. In order that the counter not be triggered to continuous discharge by a single particle resulting from atomic disintegration, the reaction is quenched by incorporating in the counting gas a polyatomic gas such as isobutane.

The above effect begins at a certain critical voltage or the threshold voltage and is relatively insensitive to voltage variations from the threshold voltage to 200 to 400 volts above threshhold voltage; that is, the Geiger plateau. Since beyond the said plateau, the counter may go into continuous discharge in spite of the presence of a quencher, the counter is operated at a voltage somewhat less than midway on the said plateau or 50 to 100 volts above threshhold voltage. Threshhold voltages with helium containing a quencher ordinarily run about 900 to 1200 volts.

When the ionic surge indicated above is developed in the counter the ions rush to the electrode and are discharged which causes a flow of electrons from the voltage source to the electrode. The electron flow is conducted through a resistor, which develops a voltage drop across said resistor. The voltage drop occurs only during the time of ion rush to the electrode, which is 50 to 200 microseconds, and thus may be changed through capacity coupling to a voltage pulse to the grid of a vacuum tube. The amplified pulses are fed to a galvanometer which is damped by a capacity-resistor combination. The pulse charges the condenser, and the condenser charge leaks off through the resistor. The greater the charge, the faster it leak off so that pulses coming at a given rate tend to maintain the charge in the condenser at a given rate of voltage. If the pulse rate increases, the average value of the voltage across the condenser increases and tends to level out at a higher value. The voltage variations across the condenser are measured with a galvanometer, the coils of which are in parallel with the resistor through which the condenser charge leaks off. The galvanometer may be calibrated in terms of pulses or counts per minute; and by changing the value of the leakage resistor or the value of the capacitance, the galvanometer may cover a considerable range of frequencies at which the pulses are generated and also the rate at which the condenser drops to zero. This instrument or count rate meter is used in the instant case in the form of a recording milliammeter in which a pen is driven to record the count rate on a chart. Actual counts may be calculated, since the rate of travel of the chart paper is known.

As above described, the counter used is a windowless flow counter; the "flow" referring to the flow of counter gas, unlike the usual Geiger counter which has an unchanging atmosphere. For weak beta radiation, such as carbon-14, it is necessary in Geiger tubes to provide a thin window to permit entrance of particles resulting from atomic disintegration; however, it is found that a mica window having a thickness of 1.4 milligrams per square centimeter causes significant stoppage of weak beta radiations. Thus the use of a windowless counter is most suitable for weak beta radiations.

The capacity of the above described test apparatus requires about 2 kg. of oil for a satisfactory test. In order that sufficiently sensitive results may be secured, synthesis of the resin is achieved with a specific activity of 2.65 microcuries of carbon-14 per gram of resin. It is necessary that a small loss of resin should be detectible in the oil, that is, 0.8 gram of resin or 2.12 microcuries of carbon-14 in 200 grams of oil, the amount of test oil used. Since this requires a detection of $1 \times 10^{-3}$ microcuries carbon-14 in one gram of oil, ordinary techniques (that is, infinite thickness of oil layer beneath the thin window Geiger-Mueller tube) could not be used. The above-described use of a gas flow counter as a semi-dip counter, as shown in Figs. 1 and 2, operates very successfully.

Figure 3:
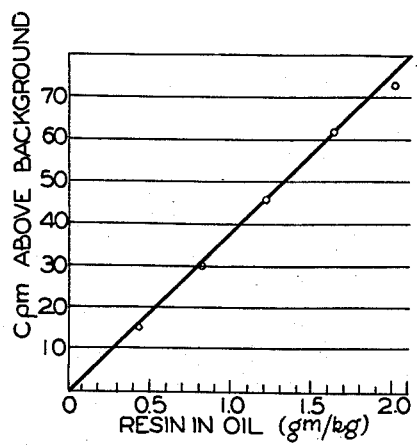
Figure 3 represents a calibration curve for the apparatus shown in Figs. 1 and 2.

To calibrate the system, the apparatus is first charged with a known weight of oil but with no oil filter element in the oil filter. The oil is circulated through the system and a count rate is charted to get a "background" count. Then a known amount of liquid radioactive resin is added, and the results are charted until several increments of resin are added, and the results are recorded. In the instant case increments are added in one gram aliquots and charted over ½ hour periods. Liquid resin is used and the amount of resin solids is determined by standard laboratory procedures. In interpreting the charts, the wavy line obtained is averaged out by visual means to give an average count rate during the period of charting. The net effect of radioactive resin content is determined by subtracting average "background" count from average count rates observed for the resin. The net count rate is then plotted against radioactive resin content of the oil as grams resin per kg. oil as a straight line, as shown in Figure 3.

In conducting a resin elution test, a known amount of oil is placed in the apparatus without a filter element and the oil is heated to the temperature at which it is desired to conduct the test. A known "background" count is run as in the calibrating procedure. A test filter element is then installed, and the count rate is observed as in the calibration procedure. Usually the charting of results is in a period between 1 and 2 hours. The net increase in count rate due to the introduction of the oil filter element is calculated and is readily read in terms of grams of resin solids per kilogram of lube oil from the calibration chart shown in Figure 3.

In preparing the radioactive test filter element, a resin free element is impregnated with a radioactive liquid resin the amount of which is known to an accuracy of a few tenths of 1%, and then cured to a known extent. The resin remaining on the test element may be readily calculated by subtracting the quantity of resin removed as determined above from the amount of resin originally present in the element.

A method which may be employed in determining the degree of cure of a phenol-formaldehyde resin impregnated filter element is as follows:

The cured or partially cured element is extracted with acetone by soaking over a period of 30 minutes in case of low amount of cure to 24 hours minimum in case of high amounts of cure. The element is rinsed thoroughly with acetone, dried and weighed according to standardized procedures and techniques. The loss of weight, X, owing to the acetone extraction represents uncured resin and the percent cure is found through calculation according to the expression $$\frac{Y-X}{Y} \times 100 \text{ equals percentage of cure}$$

where X is as defined above and Y is the total weight of resin solids originally on the element.

The calibration of the counter with infinite thickness of oil automatically corrects for the effects of counter geometry, self-absorption, varying beta particle energies, lower limit of particle energy required to ionize the chamber gas to create impulses, and counter dead time due to quenching.

In accordance with the present invention, it is, therefore possible to determine very minute amounts of resin dissolved or otherwise eluted by liquids coming in contact with the resin-containing articles.

The method of the present invention is particularly applicable to the determination of resin removal from resin-impregnated filter elements by the filtered oil. However, the method could be modified to evaluate wearing properties of plastic articles such as gears, bearings and the like.

I claim:

1. A method for determining the amount of resin removed from a resin-impregnated oil filter element by the oil passing therethrough, comprising impregnating a resin-free test element with resin chemically identical with that under test and synthesized from precursors including a radioactive precursor wherein a radioactive isotope of carbon has been substituted for at least one radiostable carbon atom in some of said precursor molecules, passing oil through said test element and determining the quantity of resin dissolved in said oil by measuring the radioactivity of said filtered oil.

2. A method for determining the amount of resin removed from phenol-formaldehyde resin-impregnated oil filter elements by the oil passing therethrough, comprising impregnating a resin-free test element with a resin which is chemically identical with phenol-formaldehyde resin and synthesized from precursors including formaldehyde having a radioactive isotope of carbon substituted for the radiostable carbon atom of some of said formaldehyde precursor molecules, passing oil through said filter element and determining the quantity of resin dissolved in said oil by measuring the radioactivity of said oil.

3. The method set forth in claim 2 wherein the isotope of carbon is carbon-14.

4. A method for determining the amount of resin removed from phenol-formaldehyde resin-impregnated oil filter elements by the oil passing therethrough, comprising impregnating a resin-free test element with a resin which is chemically identical with phenol-formaldehyde resin and synthesized from precursors including formaldehyde having a radioactive isotope of carbon substituted for the radiostable carbon atom of some of said formaldehyde precursor molecules, curing said resin, and then passing oil through said filter element and determining the quantity of resin dissolved in said oil by measuring the radioactivity of said oil.

5. The method set forth in claim 4 wherein the radioactive isotope of carbon is carbon-14.

6. A method for determining the amount of resin removed from phenol-formaldehyde resin-impregnated oil filter elements by the oil passing therethrough, comprising impregnating a resin-free test element with a resin which is chemically identical with phenol-formaldehyde resin and synthesized from precursors including formaldehyde having a radioactive isotope of carbon substituted for the radiostable carbon atom of some of said formaldehyde precursor molecules, curing said resin to from 50% to 100%, and then passing oil through said filter element and determining the quantity of resin dissolved in said oil by measuring the radioactivity of said oil.

7. A method for determining the amount of resin removed from a resin impregnated material by a liquid solvent coming in contact with said material, comprising impregnating a sample of said material which is resin-free with resin which is chemically identical with the resin under test and synthesized from precursors including a precursor wherein a radioactive isotope of carbon has been substituted for at least one radiostable carbon atom in some of the molecules in said precursor molecule, exposing said radioactive resin impregnated material to said liquid solvent and determining the quantity of resin dissolved by said solvent by measuring the radioactivity of said solvent.

8. A test oil filter element comprising filtering material impregnated with resin which has been synthesized from precursors including a precursor wherein a radioactive isotope of carbon has been substituted for at least one radiostable carbon atom in some of said precursor molecules.

9. A test oil filter element comprising a filtering material impregnated with phenol-formaldehyde resin which has been synthesized from radiostable phenol and formaldehyde having a radioactive isotope of carbon substituted for the radiostable carbon atom of some of said formaldehyde molecules.

10. A resinous article comprising phenol-formaldehyde resin which has been synthesized from radio-stable phenol and formaldehyde having a radioactive isotope of carbon substituted for the radio-stable carbon atom of some of said formaldehyde molecules.

11. A resinous article comprising resin synthesized from precursors including at least one precursor wherein a radioactive isotope of carbon has been substituted for at least one radiostable carbon in some of said precursor molecules.

References Cited in the file of this patent

UNITED STATES PATENTS

| | | |
|---|---|---|
| 2,315,845 | Ferris | Apr. 6, 1943 |
| 2,365,553 | Hill | Dec. 19, 1944 |
| 2,433,718 | Teplitz | Dec. 30, 1947 |

OTHER REFERENCES

"Radioactive Isotopes as Tracers," by Andrew W. Kramer, from Power Plant Engineering, November 1947, pages 105 to 108.